(12) United States Patent
Floris et al.

(10) Patent No.: US 11,243,140 B2
(45) Date of Patent: Feb. 8, 2022

(54) FIBER CONNECTORS FOR MULTIMODE OPTICAL FIBERS

(71) Applicant: CommScope Technologies LLC, Hickory, NC (US)

(72) Inventors: Sander Johannes Floris, Lennisheuvel (NL); Bastiaan Pieter De Hon, Eindhoven (NL); Rutger Wilhelmus Smink, Hamont-Achel (BE); Antonius Bernardus Gerardus Bolhaar, Ophemert (NL); Earl R. Parsons, Allen, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/733,956

(22) Filed: Jan. 3, 2020

(65) Prior Publication Data

US 2020/0217750 A1 Jul. 9, 2020

Related U.S. Application Data

(60) Provisional application No. 62/788,581, filed on Jan. 4, 2019.

(51) Int. Cl.
*G01M 11/00* (2006.01)
*G02B 6/38* (2006.01)

(52) U.S. Cl.
CPC .......... *G01M 11/335* (2013.01); *G02B 6/385* (2013.01); *G02B 6/3809* (2013.01); *G02B 6/3882* (2013.01)

(58) Field of Classification Search
CPC .. G01M 11/088; G01M 11/33; G01M 11/335; G02B 6/262; G02B 6/3809; G02B 6/385; G02B 6/3882
USPC .......................................................... 356/73
See application file for complete search history.

(56) References Cited

U.S. PATENT DOCUMENTS

| | | | | |
|---|---|---|---|---|
| 4,779,978 A | * | 10/1988 | Hatton | G01M 11/35 356/128 |
| 2006/0228078 A1 | * | 10/2006 | Chan | G02B 6/4246 385/92 |
| 2010/0046887 A1 | * | 2/2010 | White | G02B 6/389 385/28 |
| 2020/0182773 A1 | * | 6/2020 | Li | G02B 3/04 |
| 2020/0241220 A1 | * | 7/2020 | Evans | G02B 6/13 |

OTHER PUBLICATIONS

Fibre-optic communication subsystem test procedures—Part 4-1: Installed cable plant—Multimode attenuation measurement, International Standard Norme Internatinoale, IEC 61280-4-1, Edition 2.0, 13 pages (Jun. 2009).

(Continued)

*Primary Examiner* — Sunghee Y Gray
(74) *Attorney, Agent, or Firm* — Merchant & Gould P.C.

(57) ABSTRACT

The output profile of light from a multimode optical fiber is determined using a geometrical optics approach where the rays launched into the fiber conform to LP-modes of the fiber. This output profile can then be employed as an input to a second fiber to calculate the transmission losses of a coupler that introduces various coupling inaccuracies, such as lateral offset, axial offset, and angular offset.

5 Claims, 12 Drawing Sheets

(56) References Cited

OTHER PUBLICATIONS

Information technology—Implementation and operation of customer premises cabling—Part 3: Testing of optical fibre cabling, International Standard, ISO/IEC 14763-3, First edition, 62 pages (Jun. 2006).
Optical Power Loss Measurement of Installed Multimode Fiber Cable Plant; Modification of IEC 61280-4-1 edition 2, Fiber-Optic Communications Subsystem Test Procedures—Part 4-1: Installed Cable Plant-Multimode Attenuation Measurement, TIA Standard, TIA-5226-14-C, 70 pages (Apr. 2015).

* cited by examiner

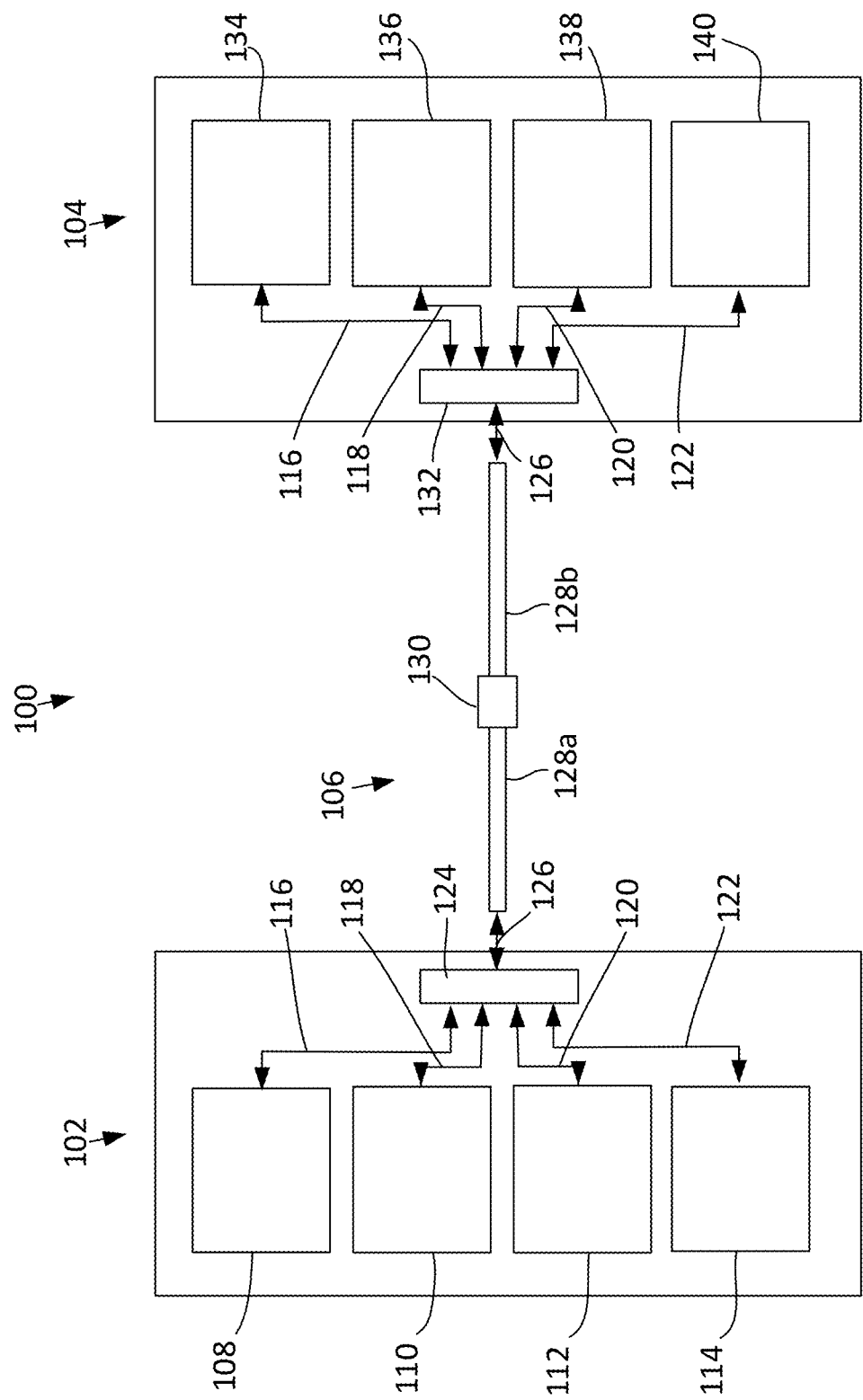

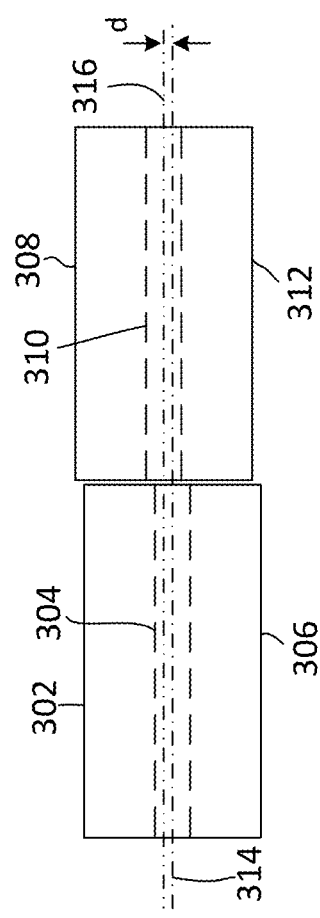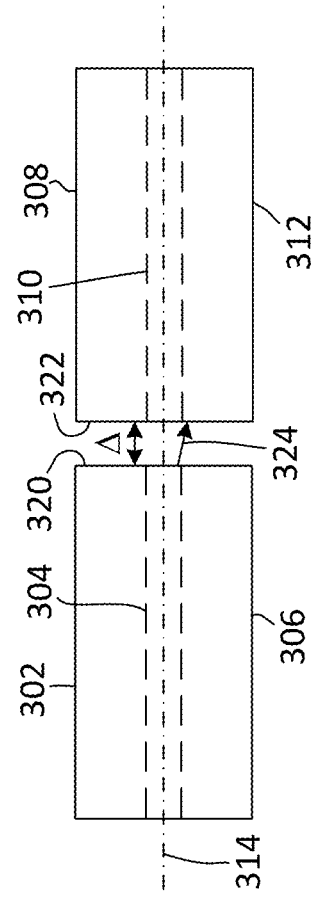

FIBER CONNECTORS FOR MULTIMODE OPTICAL FIBERS

CROSS REFERENCE TO RELATED APPLICATIONS

This application claims the benefit of provisional application Ser. No. 62/788,581, filed Jan. 4, 2019, which is incorporated herein by reference in its entirety.

BACKGROUND OF THE INVENTION

The present invention is generally directed to optical communications, and more specifically to improved methods of connecting multimode fibers.

Optical signals are transmitted along an optical fiber by injecting light from a light source, typically a semiconductor light emitting diode (LED) or semiconductor laser, into one end of an optical fiber. The light source and the optical fiber need to be in correct alignment so that as much light from the light source is coupled into the optical fiber. Optical fiber communications over distances less than about one kilometer are often carried by multimode fibers, i.e. optical fibers that support the propagation of light along more than one fiber mode. Some of the fiber modes, the lower-order modes, are predominantly located near the center of the fiber core and others, referred to as higher order modes, extend closer to the core-cladding interface.

Multi-mode optical fiber networks rely on physical contact connections to achieve minimum reflection and maximum optical transmission at each joint in an entire link. The connection attenuation is typically due to a finite fiber alignment precision, and mismatch in the fiber geometry, which includes mismatch in the fiber core diameter, numerical aperture, and refractive-index profile. To minimize the impact of the optical launch on the outcome of the attenuation measurement, the radial power density distribution in the transmitting fiber should adhere to international standards such as IEC 61280-4-1, Fiber-optical communication subsystem test procedures—part 4-1: Installed cable plant—multimode attenuation measurement (June 2009); ISO/IEC 14763-3, Information technology—implementation and operation of customer premises cabling—part 3: Testing of optical fibre cabling (June 2006); TIA-526-14-B, Optical power loss measurements of installed multimode fiber cable plant (October 2010); and CENELEC EN 61280-4-1, Fibre-optic communication subsystem test procedures—part 4-1: Cable plant and links—multimode fibre-optic cable plant attenuation measurement (2004).

There is a need to develop ways of connecting multimode fibers used in mode-division multiplexing (MDM) arrangements that does not require fusion splicing and that may be able to use legacy multimode links. Accordingly, there is a need to develop tools to understand the optical processes involved when light is transmitted from one multimode fiber to another in a mated pair of two connectors.

SUMMARY OF THE INVENTION

An embodiment of invention is directed to a method of determining a characteristic of a multimode optical fiber connector. The method includes determining at least one of a lateral offset, an axial offset and an angular offset for the multimode optical fiber connector, the multimode optical fiber adapted for coupling light between a first multimode optical fiber and a second multimode optical fiber. A first optical output profile is determined from the first multimode optical fiber using a geometrical-optics based model with an LP-mode conforming source replicating the measured launch profile with rays. A coupled amount of light from the first multimode optical fiber into the second multimode optical fiber is determined based on the first optical output profile and the at least one of a lateral offset, an axial offset and an angular offset for the multimode optical fiber connector. The optical loss is estimated for the multimode optical fiber connector based on the coupled amount of light from the first multimode optical fiber to the second multimode optical fiber.

In some embodiments a first optical output profile from the first multimode optical fiber is accurately described using a geometrical optics-based model with a launch profile of rays that are generated by the specific LP-mode conforming source. The source generates rays with a longitudinal ray-invariant $\bar{\beta}_i$ that is shaped according to a (scaled) counterpart of the modal power distribution of LP-modal electromagnetic fields for a known intensity distribution and refractive index profile. With the aid of a uniformly distributed angular ray-invariant $\bar{l}_i$, a uniformly distributed orientation $\varphi_i$ of the turning-point $r_{rp,i}$ and a uniformly distributed longitudinal launch coordinate $z_i$, the launch includes only guided rays and does not suffer from spatial transients as the rays propagate along the core of the fiber. The fiber launch of a large number of rays in from this source models a spectrally wide, incoherent light source that excites a large number of LP modes in the fiber.

In some embodiments the amount of light coupled from the first multimode optical fiber into the second multimode optical fiber is subsequently determined by applying Snell's law at the optical interface that comprises a lateral offset, an axial offset and/or an angular offset due to the mechanical alignment of two multimode optical fiber connectors. In a practical optical attenuation measurement with multimode optical fiber connectors, the transmission of optical power coupled from the first multimode optical fiber to the second multimode optical fiber may be determined as the fraction of optical power measured at the end of the second fiber with respect to the power measured at the end of the first fiber. A numerical replication of the experiment with an appropriately configured LP-mode conforming source allows to accurately determine the contribution of the fiber geometry (including fiber core diameter, numerical aperture, core-cladding concentricity) to the attenuation.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 schematically illustrates an embodiment of an optical communications system that optical communications signals along a connected multi-mode optical fiber, according to one embodiment of the present invention;

FIG. 3A schematically illustrates lateral offset of one multi-mode optical fiber relative to another;

FIG. 3B schematically illustrates axial offset of one multi-mode optical fiber relative to another;

Figure 2A:
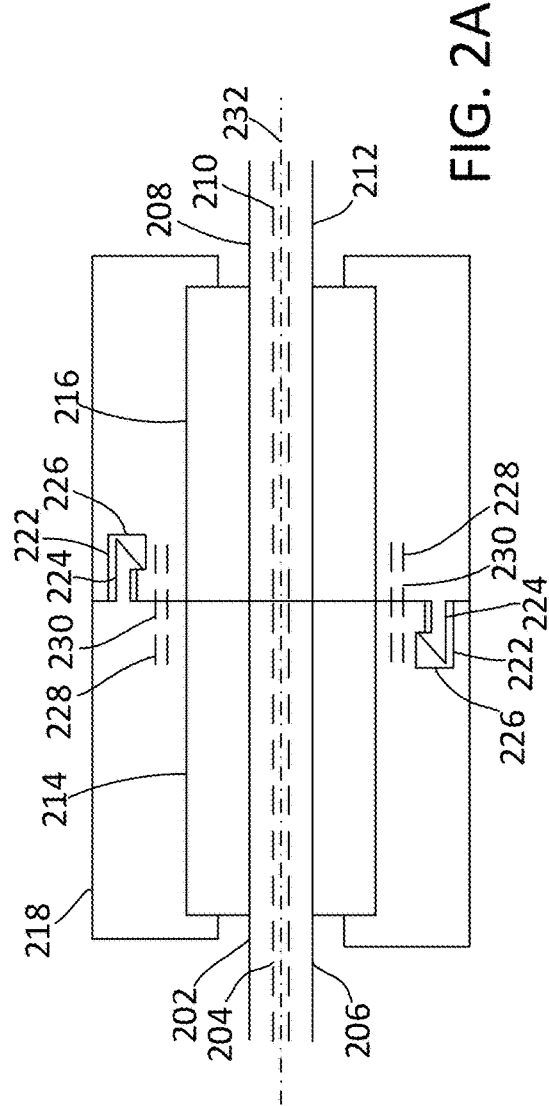
FIG. 2A schematically illustrates an embodiment of an optical connector for coupling two multi-mode optical fibers, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to an optical system that employs multi-mode optical fibers in optical fiber communications systems.

An exemplary embodiment of an optical communication system 100 is schematically illustrated in FIG. 1. The optical communication system 100 generally has a transmitter portion 102, a receiver portion 104, and an optical fiber system 106. The optical fiber system 106 is coupled between the transmitter portion 102 and the receiver portion 104 for transmitting an optical signal from the transmitter portion 102 to the receiver portion 104.

Transmitter portion 102 has multiple transmitter units 108, 110, 112, 114 producing respective optical signals 116, 118, 120, 122. The optical communication system 100 may operate at any useful wavelength, for example in the range 800-950 nm, or over other wavelength ranges, such as 1250 nm-1350 nm, 1500 nm-1600 nm, or 1600 nm-1650 nm. In this embodiment, the optical communications system employs a wavelength division multiplexed (WDM) signal to increase the bandwidth of information being communicated. Each transmitter unit 108-114 employs a light source at a specific, unique wavelength. In some embodiments, the different wavelengths are separated from each other by at least 10 nm and in other embodiments by more than 15 nm. For example, transmitter unit 108 may produce an optical signal 116 having a wavelength of 1270 nm, while transmitter unit 110 produces an optical signal 118 at a wavelength of 1290 nm, transmitter unit 112 produces an optical signal 120 at 1310 nm and transmitter unit 114 produces an optical signal 122 at 1330 nm. In another example, the transmitter units 108, 110, 112, 114 may produce optical signals signal having respective wavelengths of 870 nm, 890 nm, 910 nm and 930 nm. An optical wavelength multiplexer 124 is used to combine the optical signals 116, 118, 120, 122 into a wavelength multiplexed optical signal 126. It will of course be appreciated that a transmitter portion may include different numbers of transmitter units, each generating an optical signal at its own unique wavelength, and that the wavelengths of operation may be different from the exemplary values provided above.

The optical fiber system 106 includes a first multimode fiber (MMF) 128a and a second MMF 128b that is coupled to the first MMF 128a by a multimode fiber connector 130. Many multimode fibers (MMFs) used for operation at the wavelengths discussed above have a core diameter of 50 µm (±2.5 µm) and a cladding of 125 µm, such as OM2 OM3 and OM4 optical fibers, while OM1 fibers have a core diameter of 62.5 µm and a cladding diameter of 125 µm. Optical fibers with narrower cores or smaller contrasts in the refractive index profile, which still support the propagation of more than a single mode but fewer modes than the standard OM1, OM2, OM3 or OM4 fibers, may also be used. Such an optical fiber may be referred to as a few mode fiber (FMF). It should be understood that the terms multi-mode fiber or MMF as used herein are intended to include fibers that may be referred to as few mode fibers. A multi-mode fiber is a fiber that sustains the propagation of more than a single optical mode.

The combined optical signal 126, comprising the optical signals 116, 118, 120, 122, propagates along the optical fiber system 106 to the receiver portion 104, where it is split by an optical demultiplexer 132 into the single wavelength optical signals 116, 118, 120, 122 corresponding to the different signals generated by the transmitter units 108-114. The wavelength demultiplexed optical signals are directed to respective receiver units 134, 136, 138 and 140.

As used herein, the term "multiplexer" is a device that combines two or more separate signals into a single signal. A "demultiplexer" is a device that receives a single signal and divides it into two or more signals. Multiplexers and demultiplexers can operate on various aspects of the optical signal, for example wavelength (wavelength division multiplexing), amplitude and phase (quadrature modulation), polarization (polarization multiplexing) or specific mode group excited within the fiber (mode division multiplexing). In many cases, the same device can act as a multiplexer for optical signals passing through in a first direction and as a demultiplexer for optical signals passing through in the opposite direction.

In many optical communications systems optical signals propagate in both directions along an optical fiber channel. This possibility is indicated in FIG. 1, where the optical signals are designated with double-headed arrows. In such a case, the transmitter units 108-114 and receiver units 134-140 may be replaced by transceiver units that generate and receive signals that propagate along the optical fiber system 106. In other embodiments, there may be a separate transmitter unit and receiver unit for a signal at each end of the optical fiber system 106.

It is important that the fiber connector 140 accurately align the first MMF 128a to the second MMF 128b so as to reduce transmission loss. Where the optical signals on each MMF 128a, 128b are mode division multiplexed (MDM), accurate alignment also helps to reduce crosstalk between groups of fiber modes.

For a standard multi-mode fiber with a 50 μm core diameter and a numerical aperture of 0:2, the normalized cumulative optical power distribution, also known as encircled flux (EF), should stay within prescribed tight bounds associated with target power levels at four distinct radial coordinates. An ideal target encircled flux compliant launch has a rotationally symmetric time averaged near-field pattern and bears resemblance to the propagation of a worst case vertical cavity surface emitting laser (VCSEL) launch in a 2 m multi-mode fiber.

An exemplary connector used for connecting one MMF to another MMF is schematically illustrated in FIG. 2A. A first MMF 202 has a first core 204, shown in dashed lines, surrounded by a first cladding 206. A second MMF 208 has a second core 210, also shown in dashed lines, surrounded by a second cladding 212. The end of each fiber 202, 208, is surrounded by a respective ferrule 214, 216, which may be formed of ceramic, plastic, metal or some other suitable material. A first housing 218 is provided on the first ferrule 214, and a second housing 220 is provided on the second ferrule 216. The housings 218, 220 permit the MMFs to be held in optical alignment so as to permit an optical signal to couple from the end of one MMF into the end of the other MMF. To this end, the housings 218, 220 are provided with a locking feature 222 that permits the two housings 218, 220 to be locked together in a fixed position. In the illustrated embodiment, the locking feature 222 includes a spring arm 224 having a protrusion at one end on one housing, 218, 220. The spring arm 224 is inserted into a recess 226 on the other housing 218, 220 where the protrusion interfaces with a ledge of the recess 226. It will be appreciated that other locking mechanisms may be used to lock the housings 218, 220 together in fixed relative position. In this illustration, the axis 232 (shown as a dot-dashed line) of the first MMF 202 lies coincident with the axis of the second MMF 308.

The housings 218, 220 may also be provided with an alignment feature 228 that ensures that the first MMF 202 is aligned to the second MMF 208. In the illustrated embodiment, the alignment feature 228 includes pins 230 (shown in dashed lines) that are inserted into alignment holes in the housings 218, 220. Other types of alignment feature may be used to ensure alignment between the MMFs 202, 208.

Figure 2B:
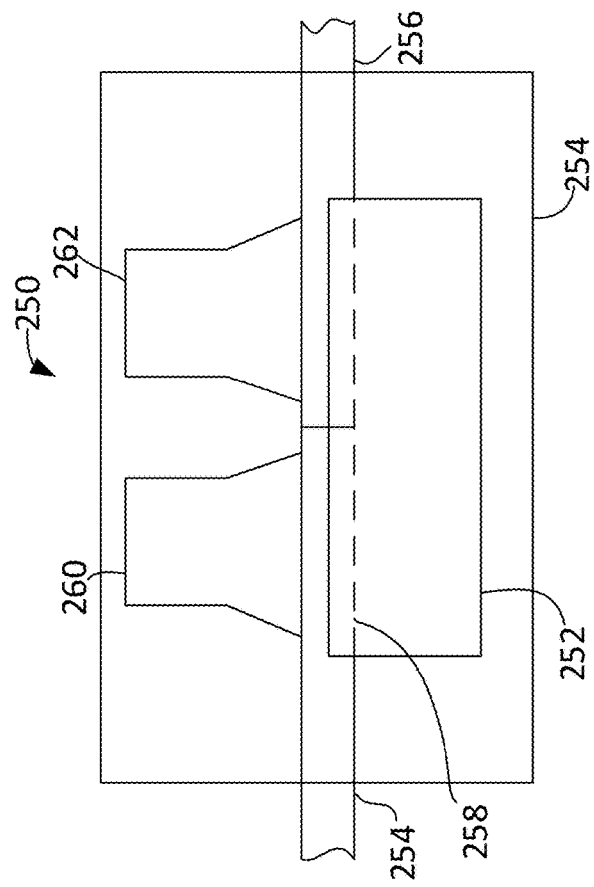
FIG. 2B schematically illustrates an embodiment of a ferrule-less fiber connector for coupling multi-mode optical fibers used in a Mode Division Multiplexing communication system, according to the present invention.

Other types of fiber connectors, which do not require the use of a ferrule, may be also used. One embodiment of a ferrule-less connector 250 is schematically illustrated in FIG. 2B. The connector 250 includes an alignment block 252 on which two fibers 254, 256 are aligned with each other. The alignment block 252 may include, for example, a v-groove 258, or elongated recess on the surface of the alignment block 252 with some other suitable cross-section, in which the fibers 254, 256 sit in alignment. A first pressure element 260 applies pressure to the first fiber 274 to maintain its location in the v-groove 258. A second pressure element 262 applies pressure to the second fiber 256 to maintain its location in the v-groove 258. In other embodiments, the two fibers 254, 256 may receive pressure from the same element to maintain their position in the v-groove 258. The connector 250 may be contained within a housing 254. The ferrule-less connector 250 may include other elements, not shown, for example elements that push each fiber 254, 256 longitudinally towards the other fiber so as to ensure contact at the ends of the fibers 254, 256, and thus enhance coupling efficiency, and elements to exert force on the pressure elements 260, 262 to hold their respective fibers 254, 276 in place. In other embodiments, the pressure elements 260, 262 may provide a downward force to keep the respective fiber 254, 256 in the v-groove 258 as well as providing a transverse force that forces the respective fiber 254, 256 towards the other fiber 256, 254.

Examples of suitable designs of ferrule-less connectors include the EC connector and the VF-45 connector. However, as discussed below, such designs of connector may require manufacturing to tighter tolerances to achieve low loss, low crosstalk MDM operation. Other embodiments of ferrule-less connectors may also be used, for example connectors in which the fibers are held in a v-groove by a force generated by bending the fiber, in which case the pressure elements 380, 382 may not be needed. Some embodiments of ferrule-less connector may provide an advantage over a ferruled connector for meeting the tighter tolerances required for connecting MMFs carrying a MDM optical signal, due to the absence of the ferrule and its concomitant causes of misalignment.

It will be appreciated that many different designs of multimode fiber connector may be addressed by the present invention including, for example, LC, MPO and SC connectors.

There are at least three types of fiber misalignment arising from the connector that can reduce the efficiency of a multimode optical fiber connection, namely lateral offset, axial offset and angular offset. These are each illustrated in turn in FIGS. 3A-3C.

Lateral offset is exemplified shown in FIG. 3A, which schematically illustrates two MMFs 302, 308. The first MMF 302 has a first core 304 in a first cladding 306. The first MMF 302 has a first fiber axis 314, shown with a dot-dashed line, that corresponds to the center of the first core 304. The second MMF 308 has a second core 310 in a second cladding 312. The second MMF 308 has a second fiber axis 316, shown with a dot-dot-dashed line, that corresponds to the center of the second core 360. Lateral offset results when the first and second fiber axes 364, 366 remain parallel but are not coincident, laterally offset from each other by an amount shown as "d." The displacement d is referred to herein as the lateral offset. If the axes 364, 366 are coincident, then there is no lateral offset and d equals zero.

Axial offset is exemplified in FIG. 3B, which shows the MMFs 302, 308 with their cores 304, 310 aligned on a common axis 314. The first MMF 302 has a first end 320 and the second MMF 208 has a second end 322 opposing the first end 320 of the first MMF 302. The first and second ends 320, 322 may be provided with optical coatings, for example anti-scratch coatings to reduce the possibility of damage to the fiber ends 320, 322, or anti-reflection coatings to reduce reflections at the ends 320, 322. The relative axial position between the ends 320, 322 that is most efficient for optical coupling between the MMFs 302, 308 is when the second end 322 is in contact with the first end 320. Transmission losses can occur if the fiber ends 320, 322 are not in contact, but are separated by an amount A. The transmission losses can arise, for example, due to resonances within the cavity formed by the two fiber ends 320, 322 and, for larger values of A, divergence of the transmitted beam outside the diameter of the core 310 of the second fiber 308, e.g. ray 324.

Figure 3C:
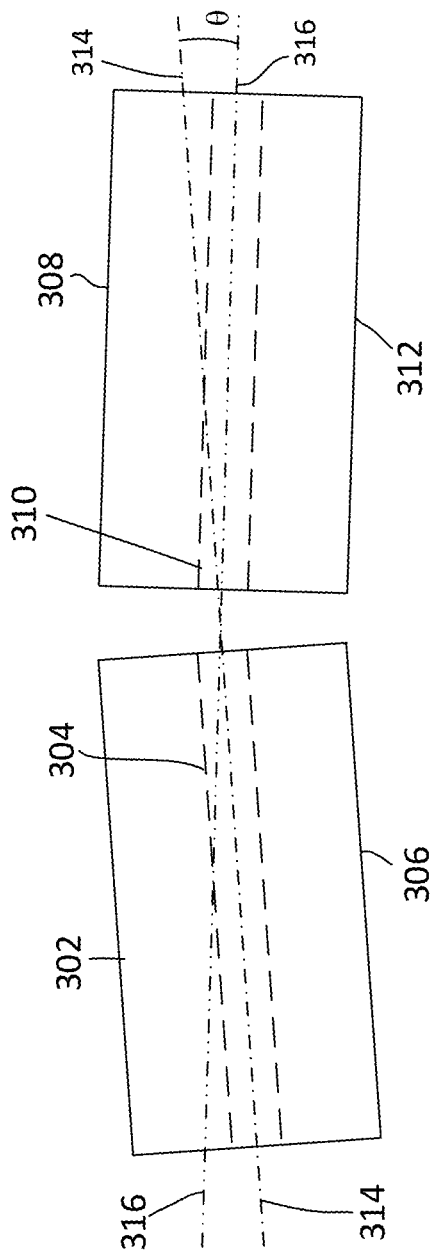
FIG. 3C schematically illustrates angular offset of one multi-mode optical fiber relative to another.

Angular offset is exemplified in FIG. 3C, which shows the MMFs 302, 308, each with a respective axis 314, 316 centrally located on its core 304, 310. The axes 314, 316 are not parallel, which results in an angle, θ, between them. In general, the greater the angle θ, the greater is the coupling loss between the fibers 302, 308.

The amount of offset, be it lateral, axial or angular, introduced by a particular fiber optic connector is dependent, at least in part, in the manufacturing tolerances of the connector, and can affect the coupling losses between the two multimode fibers being connected. Other factors that can affect the coupling loss through the connector include variations in the multimode optical fiber geometry, for example, differences in core or cladding diameter, and the position of the core within the cladding.

Modelling the optical transmission performance is one way to understand the sensitivity of the connection attenuation due to the launch condition, fiber geometry and alignment mismatch. The electromagnetic characterization of graded-index multi-mode fibers can be fully described with the aid of a vectorial full-wave modal method. An electromagnetic scattering problem at the end-face of a multi-mode optical fiber in a homogeneous medium may be solved through a field decomposition into (one-way) forward and backward traveling waves. In case a second fiber is placed in close proximity of the first fiber, the mode-equivalent waves associated with the reflection in the first fiber and the transmission in the second fiber are the ingredients to solve a multiple scattering problem in the gap between the two fibers. In the case when the gap becomes vanishingly small, one obtains the reflection and transmission of a physical contact connection. However, because the vectorial full-wave modal technique is computationally relatively intensive, it is not well suited to conduct Monte Carlo simulations of the power transmission of physical-contact connections.

A geometrical optics ("GO") approach to physical contact connection modeling is a surprisingly accurate alternative. The connection attenuation may be evaluated in a fraction of a second by simply applying Snell's law at a fiber interface, e.g. for a large number of rays such as a million, and subsequently determining the number of rays that are no longer in the guided regime of the receiving fiber. The ray propagation in the receiving fiber to the subsequent interface may be achieved, for example, with the aid of structure-preserving geometric integration routines. The challenge, however, lies at the construction of a suitable physically representative ray launch distribution. It requires more than a handful of encircled-flux (EF) targets on the cumulative near-field distribution to constrain the six degrees of freedom associated with the position and direction of each and every ray. To achieve that, the ray-based source is made to produce an intensity distribution that remains constant along the length of the fiber, even though all individual core-confined rays propagate along their own elliptical spiral ray paths. By avoiding spatial expansions and contractions along the fiber altogether, the cumulative ray density distribution may subsequently be matched to the desired encircled flux distribution as measured at the fiber end-face. The rationale for a spatially stable ray distribution is that practical encircled-flux compliant attenuation measurements are not sensitive to very small (less than 1:2 mm) length variations of the 2 m launch lead.

Figure 8A:
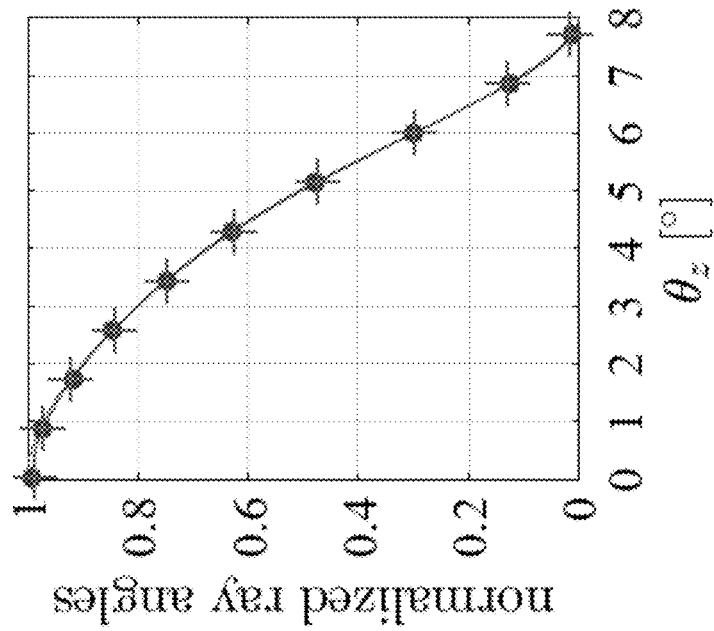
FIGS. 8A and 8B respectively show the near-field and far-field distributions generated by the LP-mode conforming source.
Figure 8B:
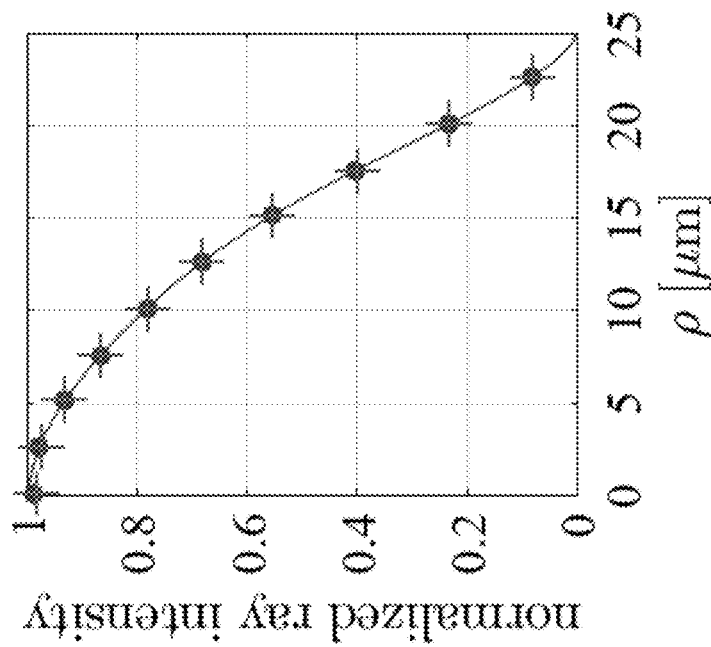

Two launch profiles are presented, that are spatially stable, encircled-flux compliant and appear identical judging from a near-field and far-field measurement as shown in FIGS. 8A and 8B respectively. To achieve spatial stability, use is made of two ray invariants that are associated with the longitudinal and circularly cylindrical symmetry of the graded-index refractive-index profile. To be able shape the ray density distribution everywhere in the core region, a monotonically increasing interpolation function is fitted to the four encircled-flux targets. The result is highlighted by the dotted curve 500 in FIG. 5A.

The first launch profile is generated by a linear polarization mode (LP-mode) conforming source model and is restricted to excite only guided rays and no leaky rays. Its ray position and direction distributions are obtained from a careful decomposition of the longitudinal ray invariant distribution that has a counterpart in the so-called modal power distribution of an encircled-flux compliant modal electromagnetic launch. Subsequent far-field propagation and connection attenuation predictions show good agreement with far-field experiments. The second launch profile is designed to excite only core-confined circular skew (spiral) rays. Remarkably, both the near- and far-field distributions are identical to those generated by the LP-mode conforming launch. Even though all the ray paths are confined to the fiber core, the longitudinal ray invariant distribution reveals that about 20% of the power is carried by leaky rays. Therefore, this launch should not be considered a physically realistic model. It is only used to show that demanding EF compliance and a spatially stable ray distribution is insufficient to achieve a unique launch definition from a geometrical optics perspective.

A comparison of results obtained using the spatially stable LP-mode conforming launch to 1 mm far-field measurements shows that the GO approach accurately predicts real life conditions.

A comparison of the GO model is made to attenuation measurements for a range of lateral misalignments between two 2 km long fibers. With the LP-mode conforming launch configured for the target launch and choosing the nominal fiber geometry, the attenuation prediction matches reasonably well to the measurements. However, the shape of the attenuation prediction improves significantly when the actual (measured) encircled flux is accounted for. Even though the measured EF is well within the permitted EF bounds, the resulting attenuation curve is significantly reduced, especially for small (less than 4 µm) lateral offsets. Thus, the measurement of the near-field pattern and the attenuation versus lateral offset curve provide valuable information for a geometrical optics model to determine features in the refractive index profile such as the fiber core diameter. Given that the core diameter of graded-index multi-mode fibers are notoriously difficult to measure with an accuracy below 1 µm, the attenuation measurements are accurately predicted by the GO model upon choosing the fiber core diameter to lie between 50.2 and 50.6 µm, instead of a nominal value of 50 μm as shown in FIG. 13B through the dashed line 1306 and dotted line 1308 respectively.

Geometrical Optical Model for Graded-Index Multimode Optical Fibers

Figure 12:
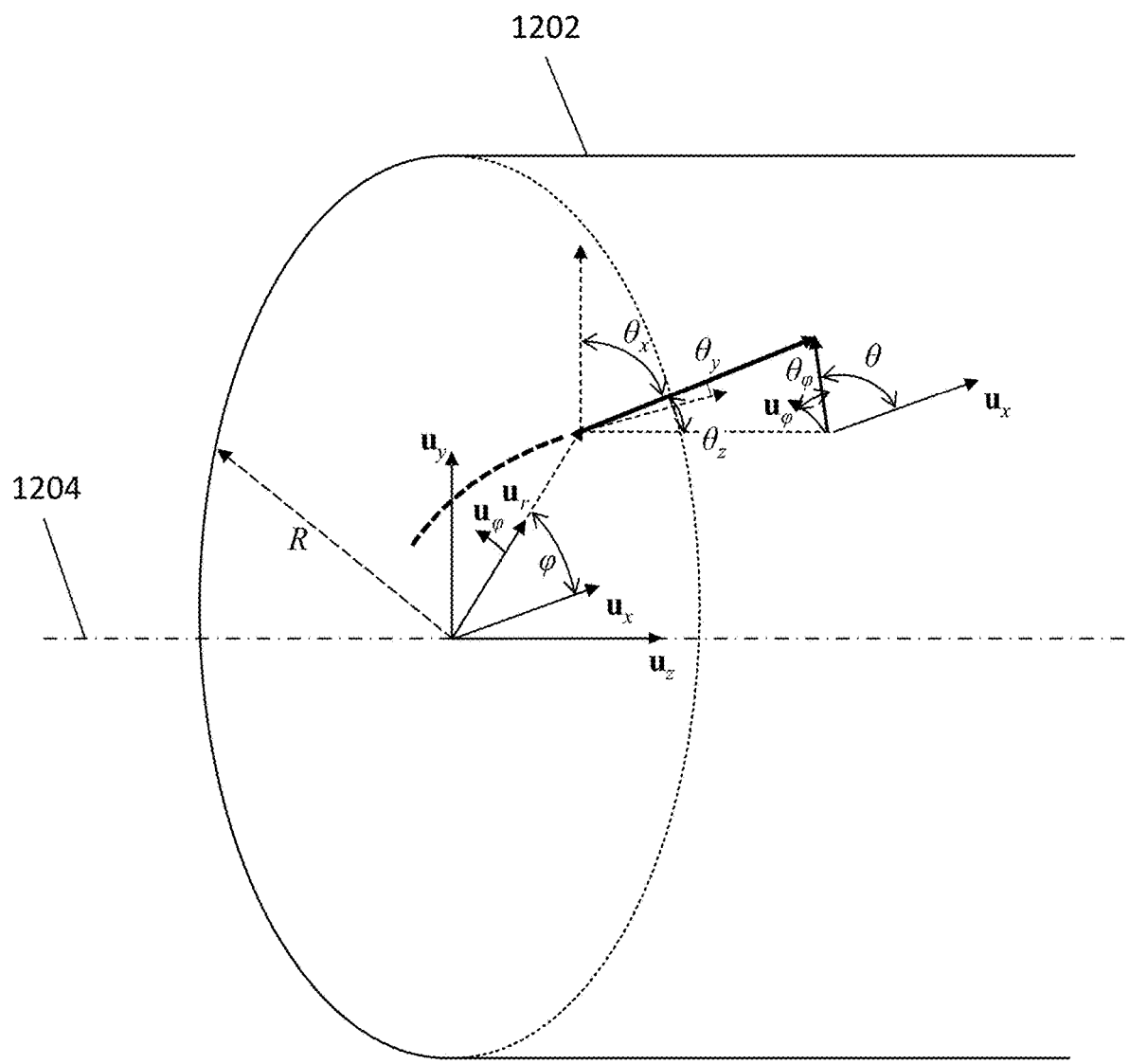
FIG. 12 shows Cartesian and cylindrical polar coordinate systems for the multimode optical fiber as well as the position and direction of a ray with respect to these coordinate systems.

A coordinate system for describing the positions and directions of rays propagating through the fiber is now described with reference to FIG. 12. The figure shows the core 1202 of a multimode optical fiber, with a radius R, measured from the center axis 1204 of the core 1202. Cartesian coordinates $u_x$, $u_y$, $u_z$ are shown, with the z-axis coincident with the core's center axis 1204. A radial coordinate, $ru_r=xu_x+yu_y$ is oriented transverse to the z-axis and points to a Cartesian (x, y) coordinate. For an exemplary ray 1206, the azimuthal coordinate φ denotes the orientation of the ray position in the transverse plane and $\theta_x$, $\theta_y$, $\theta_z$ are the angles of the ray 1206 with respect to the x-, y-, and z-axes respectively. The direction shown by θ is the direction of the ray 1206 in the cross-sectional, x-y plane.

Figure 4:
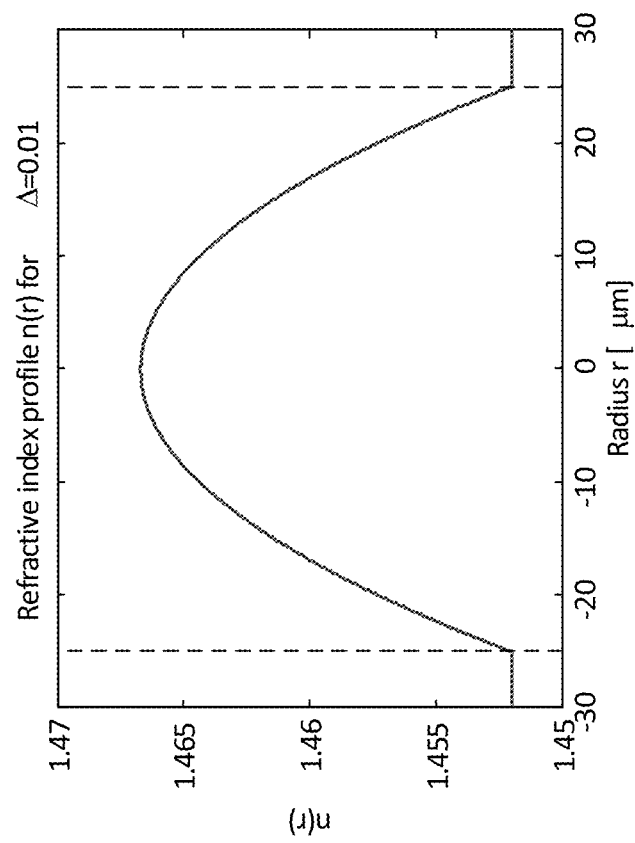
FIG. 4 schematically illustrates a parabolic refractive index profile in a graded index multimode optical fiber (MMF)

The GO model assumes the multimode optical fiber to be a lossless circularly cylindrical fiber with the refractive index having a power-law profile in the core region and a constant value in the cladding region. The refractive index, n(r), is described by:

$$n(r) = \begin{cases} n_{co}\sqrt{1-2\Delta(r/R)^\alpha}, & \text{for } r \leq R \\ n_{cl}, & \text{elsewhere} \end{cases} \quad (1)$$

see FIG. 4, where $n_{co}$ and $n_{cl}$ are respectively the core axis and the cladding refractive indices, r/R (=ρ) is the radial coordinate r normalized with respect to the core radius R, and α is the shape parameter. Without loss of generality, the value of a is assumed to be 2, which corresponds to a parabolic refractive index profile, as shown in FIG. 4. Additionally, the connection attenuation is much less impacted by a small deviation in a that it is to a mismatch in the fiber core diameter, numerical aperture of misalignment. For a regular nominal graded-index fiber with a core radius R=25 μm and a numerical aperture NA=$n_{co}\sqrt{(2\Delta)}$=0.2 are a free-space wavelength of λ=850 nm, the index contrast is $\Delta=(n_{co}^2-n_{cl}^2)/(2n_{co}^2)\approx 0.0093$.

For a GO approach to connection attenuation modeling to be accurate, the fibers have a small index contrast, a large core diameter with respect to the wavelength, and a relatively large launch distribution. At the fiber interface, the changes in the ray trajectories are easily determined through Snell's law. The attenuation is simply determined through the ratio of the number of guided transmitted rays with respect to the total number of rays launched at the interface. The ray trajectories are solutions to the eikonal equation:

$$\frac{d}{ds}\left[n(r)\frac{dR}{ds}\right] = \nabla n(r), \quad (2)$$

where $R=ru_r+zu_z$ is the position vector and s is the arc length along the ray path. Circularly cylindrical fibers aligned with the z-axis in cylindrical polar coordinates (r, φ, z) with radial coordinate r, azimuthal coordinate φ, and longitudinal coordinate z. The unit ray direction vector p=dR/ds is often described in terms of directional cosines:

$$p=[\cos\theta_x(r), \cos\theta_y(r), \cos\theta_z(r)]^T, \quad (3)$$

where $\theta_x$, $\theta_y$, $\theta_z$ are the angles of the ray with respect to the x-, y-, and z-axes respectively, as described above. The cross-sectional plane components of p can be cast in the following form:

$$\cos\theta_x(r)=\sin\theta_z(r)\cos\theta(r), \quad (4)$$

and $$\cos\theta_y(r)=\sin\theta_z(r)\sin\theta(r), \quad (5)$$

where θ(r) is the orientation of the ray direction vector in the cross-sectional plane.

Because the refractive index profile in Eq. (1) is invariant along the z- and φ-coordinates, one can derive from Eq. (2) two ray invariants, namely:

$$\bar{\beta} = n(r)\frac{dz}{ds} = n(r)\cos\theta_z(r), \quad (6)$$

and $$\bar{l} = (r/R)\,n(r)\sin\theta_z(r)\cos\theta_\varphi(r), \quad (7)$$

where $\theta_\varphi=\theta-(\varphi+\pi/2)$ is the angle between the ray direction orientation in the transverse plane and the orientational unit vector $u_r\times u_z$. $n_{cl}<\bar{\beta}\leq n_{co}$ Rays that satisfy: belong to the guided regime and are assumed to propagate unattenuated to the end of the fiber. On the other $n_{cl}^2<\bar{\beta}^2+\bar{l}^2\leq n_{co}^2$ hand, tunneling rays, that satisfy: follow a core-confined trajectory, although they gradually leak energy into the cladding region.

In view of Eqs. (2) and (6), it can be said that:

$$n(r)\frac{dR}{ds} = \bar{\beta}\frac{dR}{dz}. \quad (8)$$

Upon combining Eqs. (6) and (8) it is easily recognized that Eq. (2) may be rewritten as $$2\bar{\beta}^2\frac{d^2R}{dz^2} = \nabla n^2(r) \quad (9)$$

The second-order differential equation in this form may be solved with the aid of a Hamiltonian-preserving geometric integration routines. For a parabolic profile with ray paths that remain in the core region, the solutions are known analytically.

To quantify the spatial stability of a ray distribution, Eq. (2) is solved and the density distribution of the radial coordinates of all the rays evaluated at multiple cross-sectional planes. Instabilities are visualized through changes in the encircled flux EF(r), which is defined as:

$$EF(r) = \int_0^r r'I(r')dr' / \int_0^\infty r'I(r')dr' \quad (10)$$

where I(r') is the intensity distribution integrated along the angular coordinate. Every ray is assumed to carry unit power, so the evaluation of Eq. (10) for a collection of rays amounts to determining the ratio of the number of rays that are in a disc of radius r to the total number of rays.

The target encircled-flux distribution is defined through interpolation of the IEC-standard specified target values.

Encircled Flux Target Distribution

A radial intensity distribution is defined through the product of a parabolic function and a linear combination of Gaussian functions with dissimilar widths, $$I(\rho) = (1-\rho^2) \sum_{i=1}^{N} c_i e^{-\frac{\rho^2}{2w_i^2}} \quad (11)$$

with N amplitudes coefficients c and N Gaussian root mean square (RMS) widths $w_i$.

The parabolic function in the intensity distribution function is used to ensure that the intensity becomes zero at the core-cladding interface. This is required because geometrical optics does not allow to describe a field beyond the core-cladding interface without resorting to, for example, the geometrical theory of diffraction. Moreover, the parabolic shape is already a reasonable approximation to an overfilled launch. The sum of the Gaussian functions allow the shaping of the tail of the intensity distribution.

The accumulated power over a disk with radius $\rho_i$ is determined through the integral $$\Phi(\rho_i) = \int_0^{2\pi} \int_0^{\rho_i} \rho I(\rho) d\rho d\varphi \quad (12)$$

$$= 2\pi \sum_{i=1}^{N} c_i w_i^2 (\rho^2 + 2w_i^2 - 1) e^{-\frac{\rho^2}{2w_i^2}} \bigg|_{\rho=0}^{\rho_i}$$

N is chosen as N=5 and the first four of the five radial constraint coordinates $\rho_i$ are chosen as equal to the four radial constraints defined in the IEC standard normalized to the core radius (IEC TR 61282-11, Fiber optic communication system design guides—part 11; Multimode launch conditions (May 2012, incorporated herein by reference). Furthermore, we choose the first four of the five associated cumulative near-field targets $\Phi_i^{EF}$ equal to the encircled-flux target levels. The fifth requirement, $\Phi_5^{EF}=1$ at $\rho_5=1$, ensure that all power is carried by rays that are inside the core of the fiber. The coefficients $c_i$ that match $\Phi(\rho)_{\rho=0}^{\rho_5}=\Phi_i^{EF}$ are obtained through evaluating $c=M^{-1} \Phi_i^{EF}$, where the N×N matrix M has elements:

$$M_{i,j} = 2\pi w_j^2 (\rho^2 + 2w_j^2 - 1) e^{-\frac{\rho^2}{2w_j^2}} \bigg|_{\rho=0}^{\rho_i} \quad (13)$$

With $w_i = \rho_i$ the Gaussian RMS widths in Eq. (11) should be of comparable size as the core radius (and smaller) in order to shape the tail. Although this choice might seem arbitrary, other choices such as $w_i^2 = -\rho_i^2/(2 \log T)$ for any value of T in the range of 0.25 to 0.95 leads to almost identical curves for $I(\rho)$.

Figure 5B:
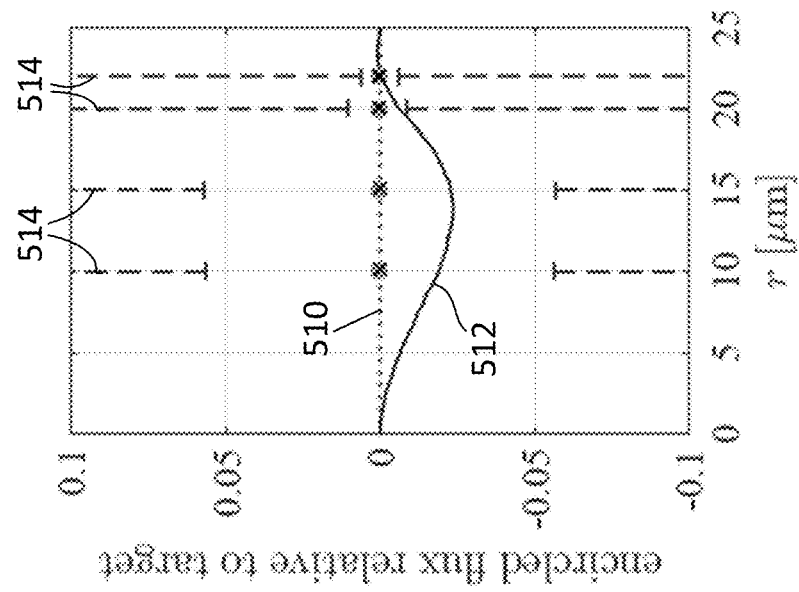
FIG. 5B presents a graph showing targeted encircled flux (EF) as a dotted line and the measured EF as a solid line relative to the targeted value, as a function of radial position, r. Vertical lies on the graph have gaps showing the acceptable limits of the measured EF.
Figure 5A:
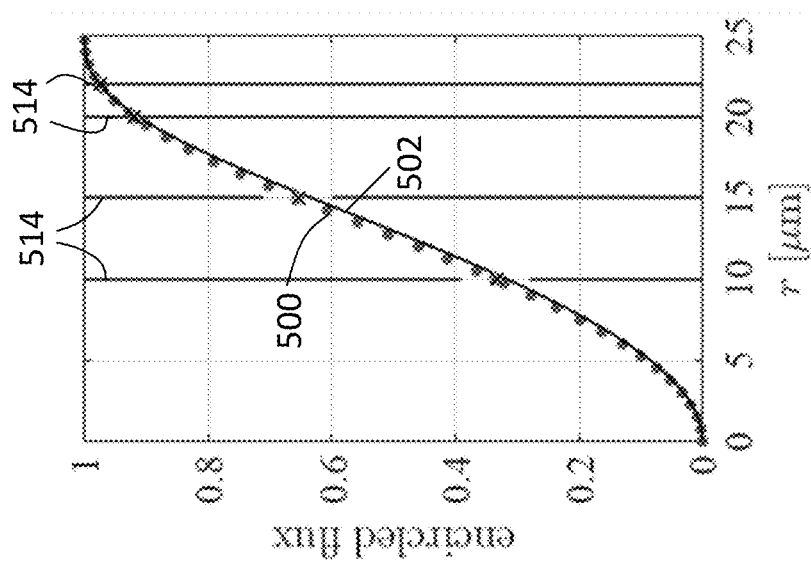
FIG. 5A presents a graph showing targeted encircled flux (EF) as a dotted line and the measured EF as a solid line, both plotted against radial position, r, in the fiber. Vertical lines on the graph have gaps showing the acceptable limits of the measured EF for compliance to IEC standards for attenuation measurements.

In FIG. 5A, the interpolated target EF curve $\Phi(\rho)$ as a function of radius, r, is shown as a dotted line 500 and passes through all targets $\Phi_i^{EF}$ for I=1, ..., 5, shown as "x" in the figure. The allowable standard-acceptable values of EF at various values of r are shown as the gaps in the vertical lines 504. The line 502 highlights the EF as measured at the endface of the transmitting fiber before attenuation. Lines 500 and 502 both pass within the gaps of the vertical lines, showing they are EF compliant. FIG. 5B shows the same information, but plotted as relative to the target EF. Dotted line 510 corresponds to dotted line 500 in FIG. 5A, and is the interpolated EF. The solid line 512, corresponding to line 502 in FIG. 5A, shows the relative EF based on measurements. The acceptable EF limits are shown in FIG. 5B as gaps in the vertical lines 514. The measured EF 512 stays within the bounds of acceptable EF. Spatially stable ray launches are constructed to generate N rays distributed spatially according to Eq. (12) as N→∞.

Stable Ray-Invariant Based Launch Profiles

Two launch profiles are now described, that both represent the target EF-compliant intensity distribution at every arbitrary cross-sectional plane, with an LP-mode conforming launch described first, followed by a launch profile having only circular spiral rays as an elucidating example.

Example Launch Profile 1: LP-Mode Conforming Guided Ray Launch

A stable source can be described using two uniformly distributed random parameters ($p_i$, $q_i$) to permit the retrieval of the two ray invariants ($\bar{\beta}$ and $\bar{l}$), which in turn permit the retrieval of the ray launch position, $\rho_i$, and angle, $\theta_{z,i}$, for each ray. Preferably the launch profile satisfies EF targets in the near field, does not produce spatial transients, the field energy is carried by guided rays only, and the selection of ($p_i$, $q_i$) should always generate the same ray path.

Figure 6:
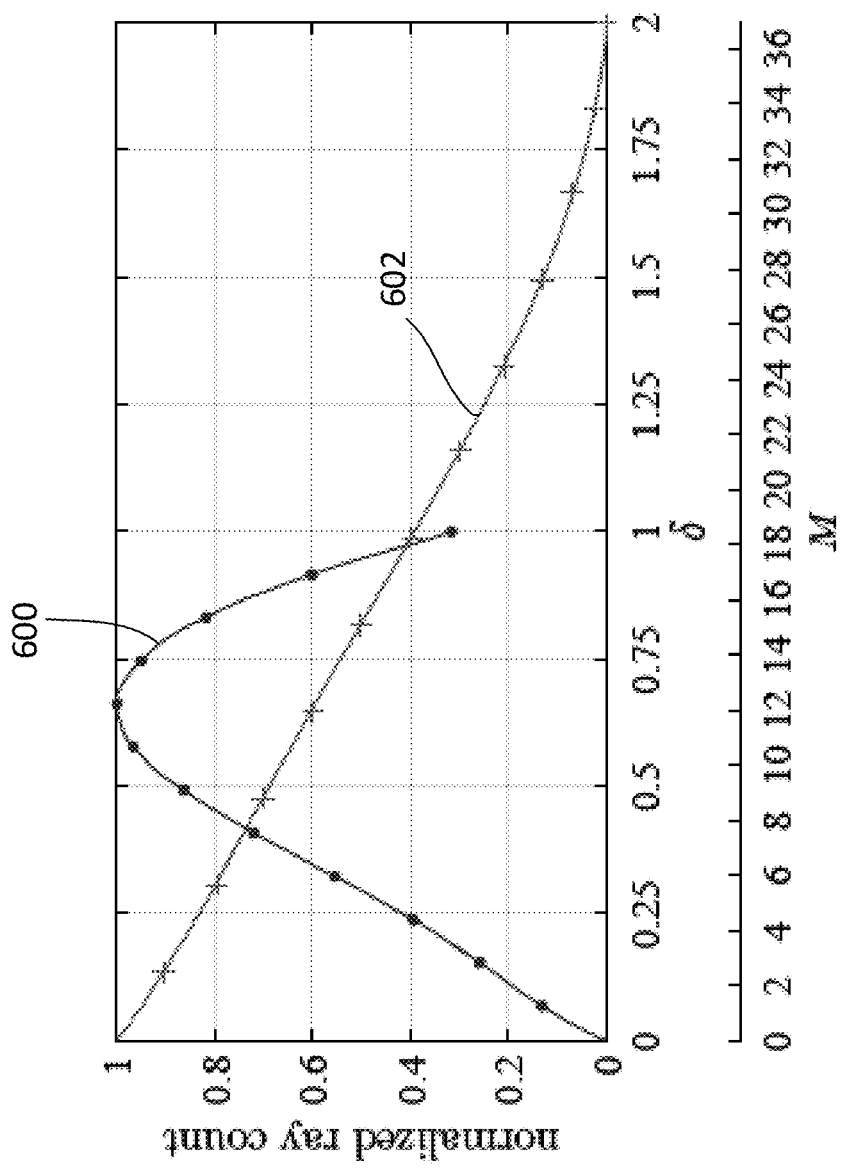
FIG. 6 is a graph showing normalized ray count as a function of δ (corresponding to mode group number, M) for an LP-mode conforming launch and a circular skew ray-angle launch.

To represent a longitudinal-invariant cylindrical symmetric light intensity distribution with rays, the ray invariants $\bar{\beta}$ of all rays are distributed according to a scaled version of the modal-power distribution of an electromagnetic LP-mode launch. Although a light intensity distribution emitted from a multi-mode fiber is generally not uniquely connected to one set of modal amplitudes, by following the so-called mode-continuum approximation, which assumes that all modes in a degenerate mode group carry equal power, a surprisingly simple relation between a modal power distribution (MPD) and the radial derivative of an axisymmetrical intensity profile dI(r)/dr exists for an $\alpha$-profile fiber. Ignoring constants and assuming $\alpha=2$ in Eq. (1), the MPD is related to $I(\rho)$ via:

$$MPD(\delta) \propto -\frac{\sqrt{\delta}}{R} \frac{dI(\rho)}{d\rho} \bigg|_{\rho=\sqrt{\delta}} \quad (14)$$

where $\delta \in (0,1)$ is the relative mode-group number. The MPD function is assumed to be normalized according to $\int_0^1 MPD(\delta) d\delta = 1$. The MPD distribution evaluated for the target EF intensity distribution in Eq. (11) is shown in FIG. 6 as the curve 600. The energy is confined to the space $0<\delta<1$, the set of guided rays and, equivalently, to the set of LP-mode groups with a mode-group number M≤18.

Although Eq. (14) may be derived with the aid of geometrical optics analogies, it is not used to construct actual geometrical optics ray launch profiles. However, the relative mode-group number $\delta$ is linked to the $\bar{\beta}$ ray invariant through:

$$\bar{\beta} = n_{co}\sqrt{1-2\Delta\delta} \quad (15)$$

albeit with $\delta \to \delta/\Delta$ and $\bar{\beta} \to \bar{\beta}\lambda/(2\pi)$, where $\beta$ is the modal propagation coefficient.

To launch the $i^{th}$ ray, the modal power distribution in Eq. (14) is sampled by solving:

$$p_i - \int_{\delta=0}^{\delta_i} MPD(\delta) d\delta = 0 \quad (16)$$

where $p_i \in U(0,1)$ randomly samples a uniform distribution. The $\bar{\beta}_i$ invariant associated with $\delta_i$ follows from Eq. 15. The subsequent decomposition of $\bar{\beta}_i$ to a ray position $\rho_i$ and direction $\theta_{z,i}(\rho_i)$ that satisfies Eq. 6 is made in two steps.

First, an arbitrary elliptical spiral path is chosen by selecting $$\bar{l}_i = q_i \bar{l}_{max}(\beta i) \quad (17)$$

with $q_i \in U(-1,1)$ randomly sampling a uniform distribution so that for $q_i=0$, $\bar{l}_i$ represents a meridional ray, and for $q_i=1$, $\bar{l}_{max}(\beta)$ represents a circular skew ray. The sign of $\bar{l}_i$ determines whether the ray path is spiraling in a left-hand or right-hand motion. For convenience, the upper bound can be derived as:

$$\bar{l}_{max}(\bar{\beta}) = \frac{n_{co}^2 - \bar{\beta}^2}{2\sqrt{n_{co}^2 - n_{cl}^2}} \quad (18)$$

The rationale for a uniform distribution is to remain consistent with the mode continuum approximation as well as the assumption of a spectrally wide light source. The longitudinal and angular indices of the LP-modes are linked to a discrete set of geometrical optics ray invariants $\bar{\beta}$ and $\bar{l}$ that are evenly spaced along the $\bar{l}$ coordinate. In view of the large spectral width of the source, the equidistant $\bar{l}$ spread evenly, which justifies a uniform representation. With $\bar{\beta}_i$ and $\bar{l}_i$ determined for the $i^{th}$ ray, the spiral trajectory is now defined except for the orientation and launch coordinate.

Figure 7:
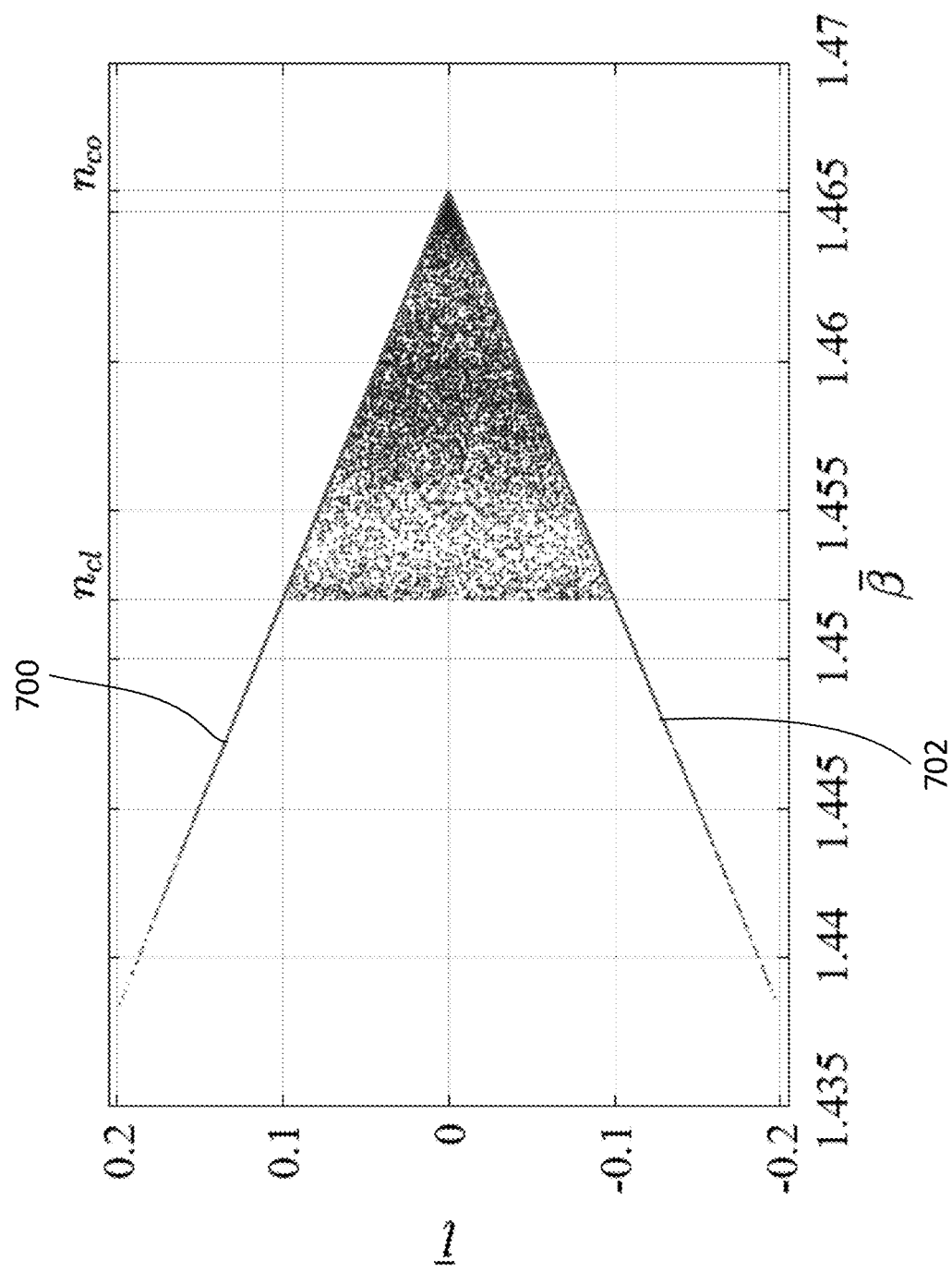
FIG. 7 is a graph showing the distribution of rays in an LP-mode conforming launch in the $\bar{\beta}$–$\bar{l}$ plane, for propagation constants corresponding to values between the core and cladding refractive indices, and the distribution of rays in a circular skew ray-angle launch.

Upon randomly generating a million rays, the distribution in the $\bar{\beta}$-$\bar{l}$ plane is shown in FIG. 7 through the dots between the two lines 700 and 702. Circular skew rays mark the edges along the $\bar{l}$ coordinate and are highlighted by the lines 700, 702.

As a second step, the elliptical ray path is oriented with respect to the fiber by positioning the turning point in the cross-sectional plane at $(x_i, y_i) = (\rho_{tp,i} \cos \varphi_i, \rho_{tp,i} \sin \varphi_i)$ through a uniformly distributed orientation parameter $\varphi_i \in U(0, 2\pi)$. The expression for the turning point ray location $\rho_{tp,i}$ is a solution of Eq. (23) and is discussed in greater detail below. At the turning point, the orientation of the ray direction vector is governed by the angle $$\theta_i = \varphi_i - \text{sign}(\bar{l}_i)\pi/2 \quad (19)$$

and with the aid of Eqs. (4) and (5), the unit ray direction vector $p_i$ in Eq. (3) is now defined by:

$$p_i = \begin{bmatrix} \cos(\theta_i)\sqrt{1 - [\bar{\beta}_i/n(\rho_i)]^2} \\ \sin(\theta_i)\sqrt{1 - [\bar{\beta}_i/n(\rho_i)]^2} \\ \bar{\beta}_i/n(\rho_i) \end{bmatrix} \quad (20)$$

As a third and final step, the turning point $(x_i, y_i)$ is positioned at an arbitrary longitudinal coordinate $z_i \in \mathcal{U}(z_0, z_0 + z_{p,i})$ between the launch plane $z_0$ and $z_0 + z_{p,i}$, one ray pitch length further inside the fiber. This way, a random phase is achieved with the rays, which was one of the requirements of the model power distribution of Eq. 14 to be valid. The pitch length $z_{p,i}$ for a ray in the fiber is defined by:

$$z_{p,i} = 2\pi R \bar{\beta}_i / (n_{co}\sqrt{2\Delta}) \quad (21)$$

Propagation of all the rays back to the launch plane at $z=z_0$ completes this LP-mode conforming launch construction.

Figure 9B:
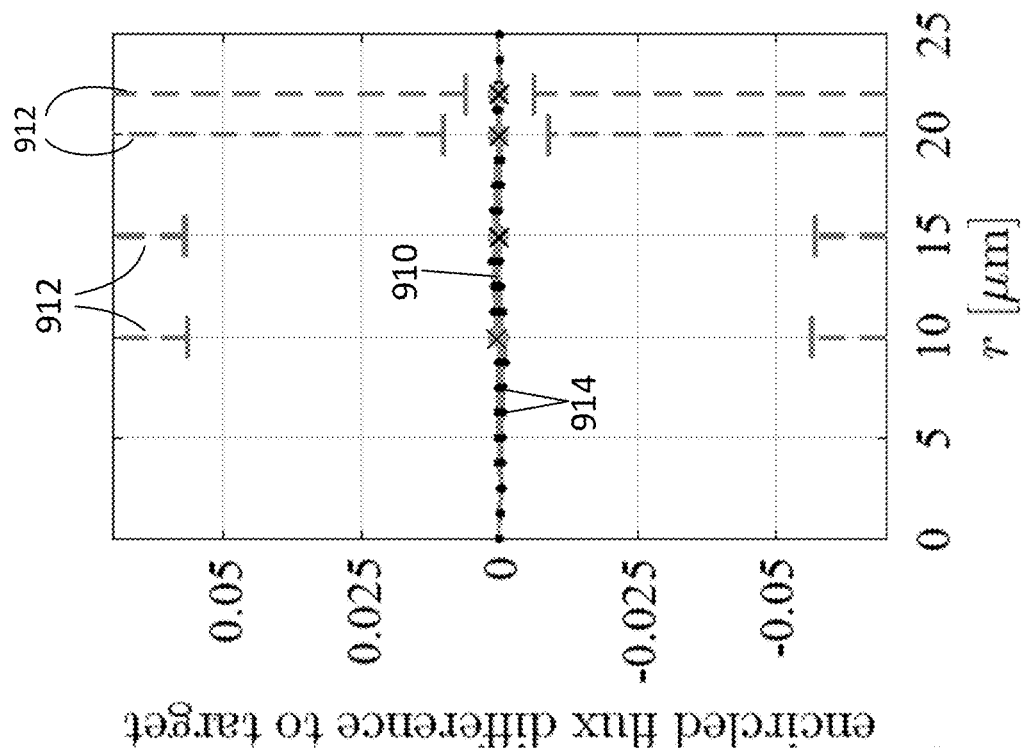
FIGS. 9A and 9B respectively show the calculated EF and relative EF to target EF as a function of radial position, r, for the LP-mode conforming launch profile, both at launch and after propagation through 2 m along the fiber.
Figure 9A:
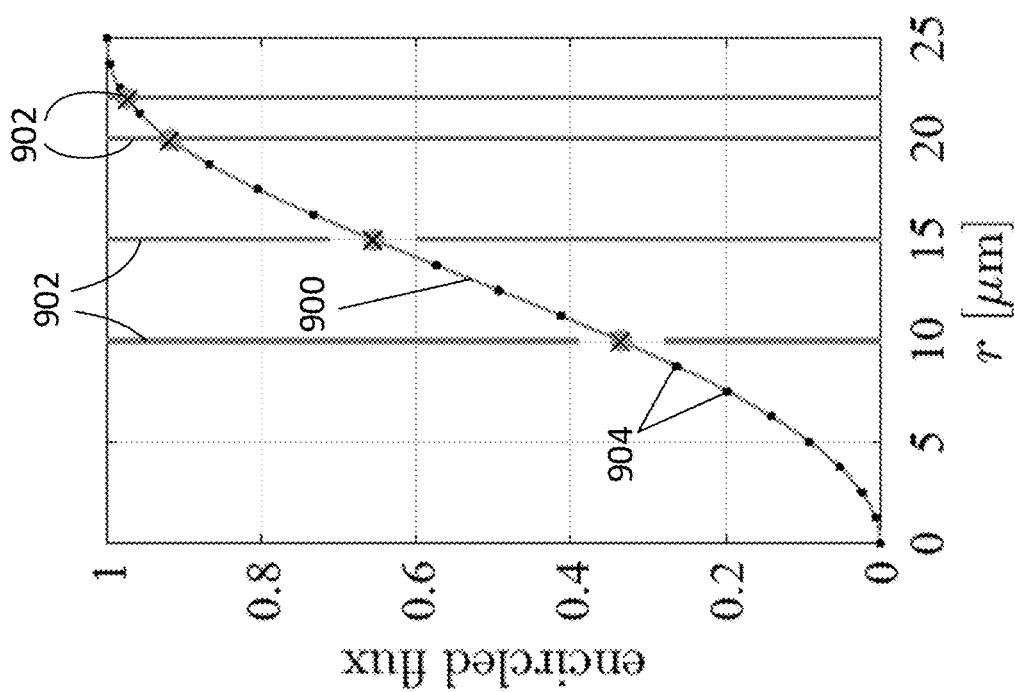

The near- and far-field intensity distributions generated by 10 million rays are shown in FIGS. 8A and 8B. Through numerical evaluation of Eq. (2), all the rays have been propagated through the fiber and the EF was monitored by 50 non-absorbing cross-sectional detector planes positioned equidistant between $z=z_0$ and $z=z_0+z_p$. The pitch length of all guided rays is approximately $z_p \approx 2\pi R/(\overline{2\Delta})$ 1.15 mm, with a deviation of only about 10 μm. The EF at all these interfaces are shown in FIGS. 9A and 9B and appear as 50 overlapping grey curves. FIG. 9A shows the calculated EF, curve 900 while FIG. 9B shows the relative difference between the calculated EF and the target EF (curve 910). The acceptable EF limits are shown as gaps in the vertical lines 902 and 912 at various values of r in FIGS. 9A and 9B respectively. This shows that the LP-mode conforming source indeed generates a spatially stable ray distribution. In this case the launch was configured to pass through the EF target values highlighted by "x" on the two curves.

The same experiment was repeated with an additional 2 m of propagation and highlighted by the black dots 904 and 914 in FIGS. 9A and 9B respectively, which illustrates that the launch profile remains stable and keeps will within the EF bounds along the length of the fiber.

Example Launch Profile No. 2: Circular Skew Ray Launch Profile

As an elucidating example, a second launch profile was constructed, that only excites circular-skew rays to produce the same intensity pattern as the LP-mode conforming launch profile. For every ray orbit at a fixed radial distance from the center of the core, the ray density distribution is automatically spatially stable from a ray-tracing perspective.

In this launch profile, rays are excited by solving:

$$u_i - \Phi(\rho_i) = 0 \quad (22)$$

with $u_i \in U(0,1)$, where $u_i$ samples a uniform distribution and where $\Phi$ is the cumulative near-field pattern of Eq. (12). As the number of excited rays grows large, the radial density distribution approaches the intensity distribution of Eq. (11).

To make each ray circular skew, the angle $\theta_\varphi$ of Eq. (7) is set to zero everywhere along the ray path. $\bar{l}^2|_{\theta_\varphi=0}$ can be rewritten so that Eqs. (6) and (7) can be combined, leading to the requirement that every $i^{th}$ ray satisfies:

$$n^2(\rho_i) - \bar{\beta}^2 - \bar{l}^2/\rho_i^2|_{\theta_\varphi=0} = 0 \quad (23)$$

The expression Eq. (23) is quadratic in $\rho_i^2$ and depends on the angle $\theta_z$. In order for the inner caustic and turning point solutions to coincide at the a priori chosen radial coordinate $\rho_i > 0$, the discriminant of Eq. (23) must vanish (double roots). Substituting the $\alpha=2$ refractive index profile n of Eq. (1) into Eq. (23) results in:

$$2\Delta n_{co}^2 \rho_i^2 + n_{co}^2 - \bar{\beta}^2 - \bar{l}^2/\rho_i^2|_{\theta_\varphi=0} = 0 \quad (24)$$

Upon inspecting Eqs. (6), (7) and (24), it can be inferred that the discriminant $$(n_{co}^2 - \bar{\beta})^2 - 8\Delta n_{co}^2 \bar{l}^2|_{\theta_\varphi=0} = 0 \quad (25)$$

Vanishes for two solutions of $\theta_z$, that satisfy $$\sin(\theta_z) = \pm \frac{\sigma}{\sqrt{1-\sigma^2}}, \text{ with } \sigma = \rho_i \sqrt{2\Delta} \quad (26)$$

The positive solution corresponds to a circular skew ray in the $u_z \times u_r$ direction, whereas the negative solution corresponds to the opposite direction. The resulting launch profile is identical to the LP-mode conforming launch profile judging from both the near-field and far-field patterns. However, the differences appear for instance on the attenuation due to lateral misalignment behavior, because the circular-skew launch has entirely different longitudinal $\bar{\beta}$ invariant distribution, shown as curve 602 in FIG. 6. Only about 80% of the rays are actually associated with the guided regime of the fiber, whereas the remaining 20% are associated with leaky rays with $\bar{\beta}<n_{cl}$ or $\delta>1$ and make this launch highly susceptible to bending and to power leakage into the cladding through the tunneling effect.

Thus, demanding spatial stability of an EF target launch by itself does not guarantee a unique source from a geometrical optics perspective. Nevertheless, the LP-mode conforming source model is realistic and generates rays confined to the guided regime.

Comparison with Experimental Measurements

Figure 10:
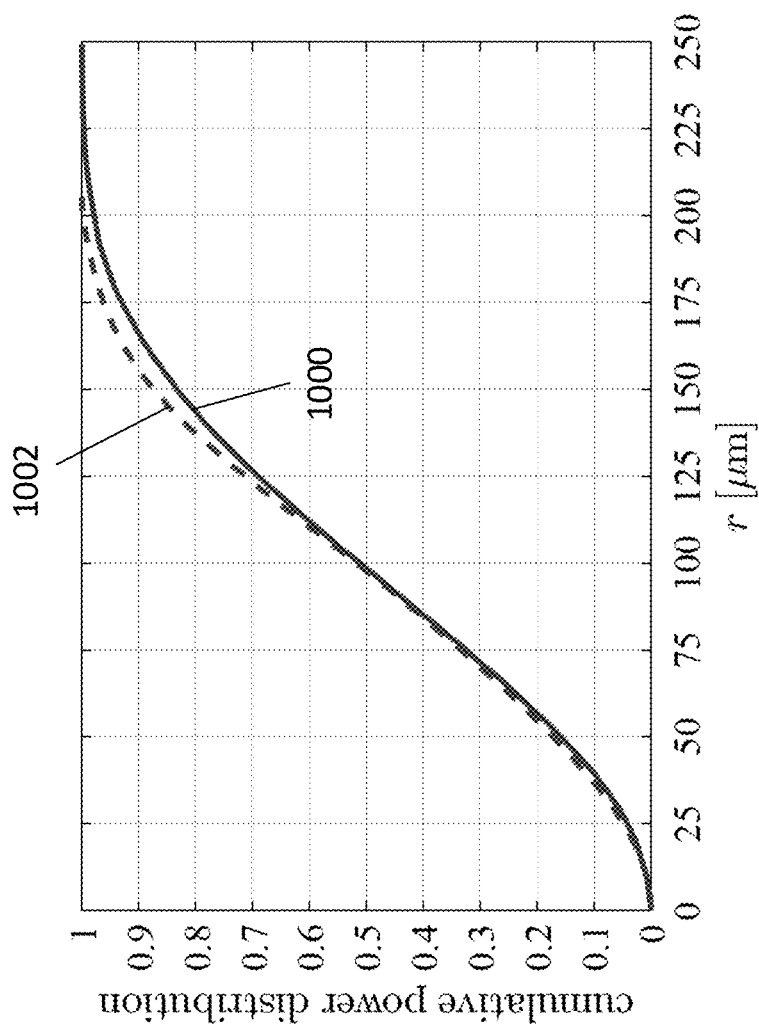
FIG. 10 shows a comparison of a measured cumulative power distribution in the 1 mm far-field regime and the cumulative power distributions calculated using an LP-mode conforming launch.

The radiation profile of the output from a MMF was measured by scanning a fiber probe (1.8 μm diameter, NA=0.35), separated from the MMF end by a distance of 1 mm, across the fiber end, in 1 μm steps. The resulting accumulated optical power distribution on a disk of radius r is shown in FIG. 10. The solid line 1000 represents the measured values. To model the measurements, Snell's law was applied at the fiber-air interface and the rays propagated to the detector plane. A reconstruction made using the LP-mode conforming source is shown as the dashed line 1002. A surprising result was that the tail of the power distribution does not seem to be hindered by the inability of geometrical optics to describe rays just beyond the core-cladding interface. Non-LP-mode conforming ray distributions, such as a Gaussian distribution or a Lambertian distribution, are unable to produce EF compliant solutions that model the measured profile as well as the LP-mode conforming distribution.

Figure 11A:
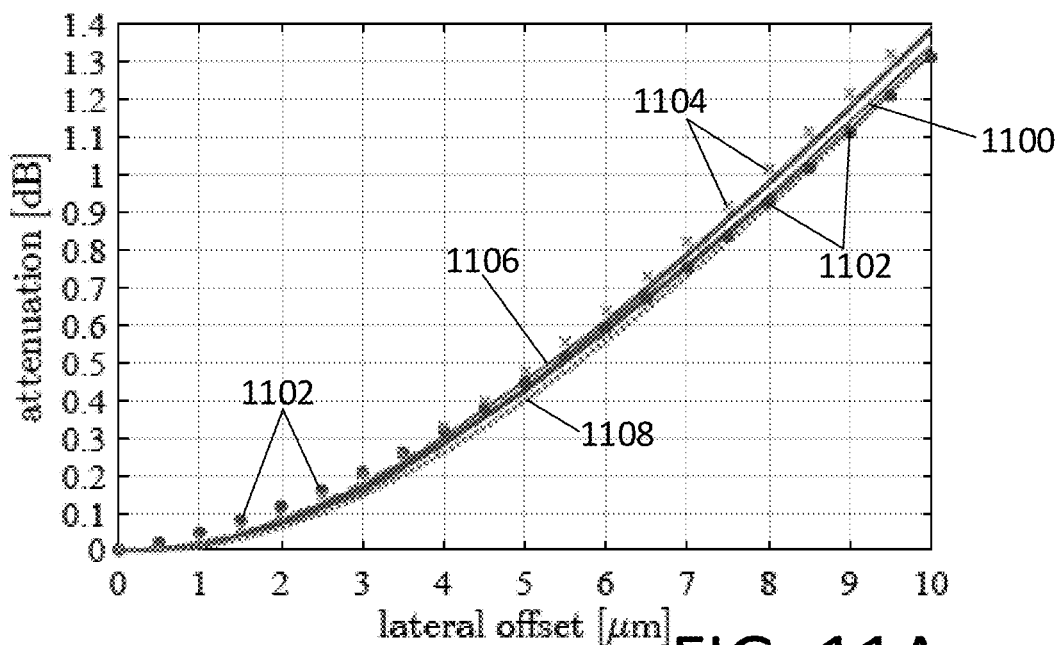
FIGS. 11A and 11B show a comparison of measured lateral offset loss against lateral offset losses calculated using an LP-mode conforming launch. The grey solid lines are measurements of the attenuation verses lateral offset. The blue lines represent a numerical experiment with a target EF launch, the purple crosses denote the numerical experiment with a replicated intensity pattern. The red dashed line and dotted line are the results for a 50.4 µm core and 50.6 µm fiber core diameter.
Figure 11B:
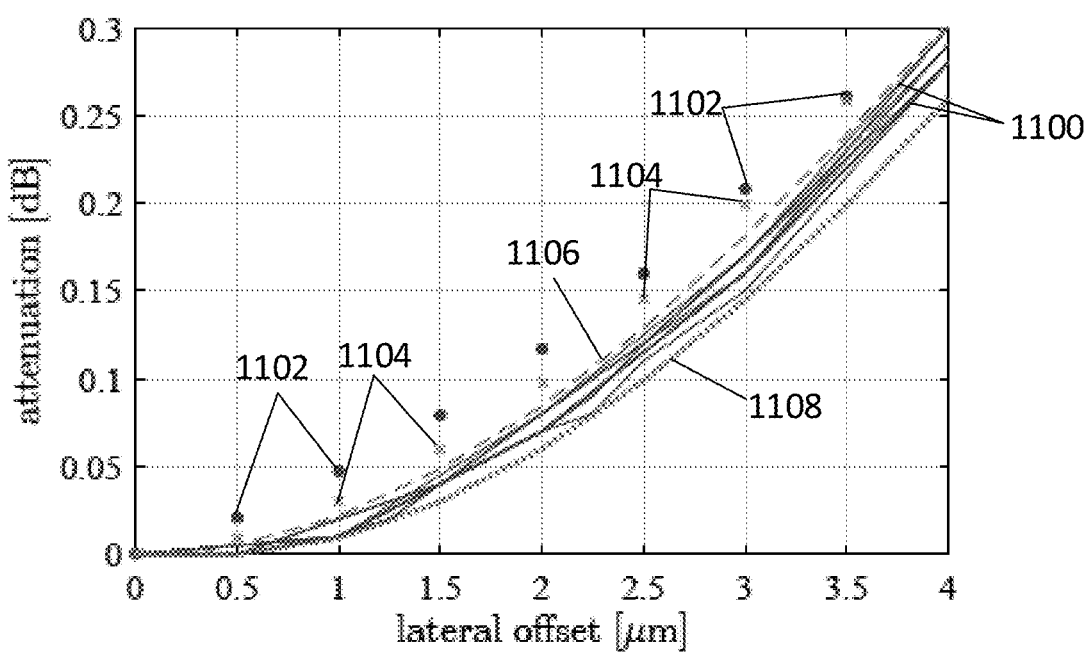

Attenuation measurements were made over a range of lateral misalignments between two identical fibers. While the optical power transmitted by the receiving fiber was being monitored, input end of the receiving fiber was laterally displaced, relative to the output face of the transmitting fiber, in all four directions along two perpendicular axes crossing the fiber core using high-precision controllable alignment stages. FIGS. 11A and 11B shows the attenuation results as solid curves 1100. FIG. 11A shows the results over the lateral offset range of 10 μm, while FIG. 11B shows an expanded view of results over a lateral offset range of 4 μm.

To assure that leaky wavefields had well decayed, the transmitting and receive fibers were each 2 km long. The measurements were repeated with and without index-matching fluid at the interface between the two fibers, but this did not impact the shape of the attenuation curves.

With the LP-mode conforming launch configured for the EF target launch in a fiber with nominal core diameter and NA, the attenuation prediction matches quite reasonably to the measurements as shown as dots 1102. However, the shape of the attenuation prediction improves significantly as shown through the crosses 1104 when the launch is configured to reconstruct the measured EF distribution that was shown in FIG. 5A with the solid curve 500. Even though the measured EF was well in the permitted EF bounds, the significant reduction of the attenuation curve for small (less than 4 μm) lateral offsets as seen in FIG. 11B was unexpected. However, a small increase in the core diameter of the modeled fiber from 50 μm to 50.2 μm (dashed curve 1106) and to 50.6 μm (dotted curve 1108) leads to attenuation prediction curves that give an even better match on the upper- and lower-bound for the measurements. respectively highlighted through a red dashed and red dotted curve. Refractive near-field measurements of the fibers to characterize the refractive index profile were inconclusive on the (variation on the) actual core diameter. Other techniques, such as a transmitted near-field method, were unable to provide an accuracy below 1 μm on the core-diameter measurement. With that in mind, the combination of an EF measurement, an attenuation versus lateral alignment scan and the LP-mode conforming source model seems to give good insight in the fiber geometry.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to fiber optical communication and data transmission systems. Accordingly, the present invention should not be considered limited to the particular examples described above, but rather should be understood to cover all aspects of the invention as fairly set out in the attached claims.

The invention claimed is:

1. A method of determining a characteristic of a multimode optical fiber connector, comprising:
   determining at least one of a lateral offset, an axial offset and an angular offset for the multimode optical fiber connector, the multimode optical fiber connector adapted for coupling light between a first multimode optical fiber and a second multimode optical fiber;
   determining a first optical output profile from the first multimode optical fiber using a geometrical-optics based model, wherein the first optical output profile conforms to a linear polarization mode (LP-mode) source that replicates a measured output profile;
   determining a coupled amount of light from the first multimode optical fiber into the second multimode optical fiber based on the first optical output profile and the at least one of a lateral offset, an axial offset and an angular offset for the multimode optical fiber connector;
   estimating an optical loss for the multimode optical fiber connector based on the coupled amount of light from the first multimode optical fiber to the second multimode optical fiber.

2. A method as recited in claim 1, wherein determining the first optical output profile is based on using a first ray invariant, $\bar{\beta}$, with $$\bar{\beta}=n(r)\cos(\theta_z)$$

where n(r) is the value of refractive index within a core of the first multimode optical fiber as a function of radial position, r, from the center of the core of the first multimode optical fiber and $\theta_z$ represents an angle of a ray relative to a z-axis of the first multimode optical fiber, the z-axis being coincident with a longitudinal axis of the first multimode optical fiber.

3. A method as recited in claim 2, wherein the first ray invariants are distributed according to a scaled version of the modal power distribution of LP-modes.

4. A method as recited in claim 3, where ray position density remains spatially stable along a length of the fiber.

5. A method as recited in claim 2, wherein determining the first optical output profile is based on using a second ray invariant $$\bar{l}=(r/R)n(r)\sin\theta_z(r)\cos\theta_\varphi(r)$$

where R is a radius of the core of the first multimode optical fiber, and $\theta_\varphi$ is the angle between a direction of the ray in a transverse plane and an orientational unit vector $u_r \times u_z$.

* * * * *